United States Patent [19]
Botz et al.

[11] Patent Number: 5,908,469
[45] Date of Patent: Jun. 1, 1999

[54] GENERIC USER AUTHENTICATION FOR NETWORK COMPUTERS

[75] Inventors: Patrick Samuel Botz; Thomas Michael Moskalik; Devon Daniel Snyder; Carol Jean Woodbury, all of Rochester, Minn.

[73] Assignee: International Business Machines Corporation, Armonk, N.Y.

[21] Appl. No.: 08/800,485

[22] Filed: Feb. 14, 1997

[51] Int. Cl.[6] .............................. G06F 13/14; H04L 9/00
[52] U.S. Cl. ........................ 713/201; 395/200; 395/201
[58] Field of Search .............................. 395/187.01, 186, 395/188.01

[56] References Cited

U.S. PATENT DOCUMENTS

| | | | |
|---|---|---|---|
| 5,355,472 | 10/1994 | Lewis | 707/101 |
| 5,481,720 | 1/1996 | Loucks | 395/187.01 |
| 5,506,961 | 4/1996 | Carlson et al. | 395/186 |
| 5,530,852 | 6/1996 | Meske, Jr. et al. | 395/200.36 |
| 5,542,046 | 7/1996 | Carlson et al. | 395/186 |
| 5,560,008 | 9/1996 | Johnson et al. | 395/680 |
| 5,572,643 | 11/1996 | Judson | 395/200.48 |
| 5,623,601 | 4/1997 | Vu | 395/187.01 |
| 5,655,077 | 8/1997 | Jones et al. | 395/187.01 |
| 5,737,523 | 4/1998 | Callaghan et al. | 395/187.01 |

*Primary Examiner*—Ly Hua
*Attorney, Agent, or Firm*—Michael F. Hoffman

[57] ABSTRACT

The present invention provides a system and method of performing user authentication on web based applications, such as IBM's Network Station Configuration Preference Manager. In particular, the system and method saves and continuously passes user information back and forth between a web client and a web server. The user information can then be used by CGI programs being executed on the web server for authentication purposes. Specifically, each CGI program will examine the user information, determine the authority privileges of the user, run the CGI program under a non-default user mode, return user information back to the web client, and return the CGI job to run in a default user mode.

43 Claims, 5 Drawing Sheets

CGI-BIN get userid & ipaddr from hidden variables call SWAP_PROFILE

{EXECUTE CGI BODY} set userid & ipaddr into next html variables set adminuser flag into next html variable put up next html form call SWAP_BACK return

FIG. 2A

```
SWAP_PROFILE
if (userid hidden variable not null)
    get password from security object
    using userid & ipaddr as the key
else
    use userid & password args
    store password in security object
    check if user is a sys. admin.
    set admin-user y/n flag
get profile handle for *Current
get profile handle for userid
change job to use logged on userid
return userid,
       ipaddr,
       *Current profile handle,
       Logon user profile handle,
       adminuser flag
```
— 30

```
SWAP_BACK change job to use *Current userid
release profile handle for *Current
release profile handle for logged on user
```
— 32

GENERIC USER AUTHENTICATION FOR NETWORK COMPUTERS

FIELD OF THE INVENTION

The present invention relates to network systems using Internet technology. More particularly, the present invention relates to the authentication of users submitting job requests from web clients.

BACKGROUND OF THE INVENTION

A current trend in network computing is to provide lower cost workstations without sacrificing end-user capabilities. Such workstations are being made available through the exploitation of the emerging Internet technologies that continue to be developed. In particular, new network solutions, such as IBM's Network Station, utilize a World Wide Web environment wherein each client workstation behaves like a Web client (i.e., it utilizes a Web browser) connected to an HTTP (Hypertext Transfer Protocol) server. While these new workstations typically have less computing power than traditional personal computers or UNIX workstations (thereby reducing cost), they are better equipped to take advantage of various applications on file servers such as IBM's AS/400, PC servers, RS/6000, System/390 etc.

Web based applications on web servers are implemented through CGI (Common Gateway Interface) programs, scripts or some other form of application program interface (API), such as Netscape's™ NSAPI, Microsoft's™ ISAPI, or Java's Servlet API. Similar to the act of retrieving HTML (Hypertext Markup Language) documents on web servers from web clients, CGI programs provide the means by which web clients can run applications in real time on web servers and receive back dynamically created output. CGI programs are executed each time a client requests a URL (Uniform Resource Locator) corresponding to the CGI program. A limitation involved in the running of CGI programs is the fact that a web based server does not typically keep track or know which user is running a given CGI program. This can create potential security problems, particularly in the case where it is desirous to have programs behave differently depending upon the privilege level of the user.

Accordingly, it is of particular importance with such systems that utilize Internet technologies to provide some means of user authentication. Unlike with existing terminal emulation networking, web-based systems do not necessarily know, or care to know, who the user is that wants to run a particular CGI program or what the user's level of privileges are. As noted, this can become a serious limitation if an end user is a systems administrator, and the end user needs to perform system configuration functions from a remote workstation. For example, a systems administrator should be able to pull up non-default screens and execute protected programs not available to the general public. (E.g., certain menu options, such as the option to manipulate a password file, should not be available to every user.)

While it is known to have CGI programs execute differently depending upon the user profile or ID supplied to the operating system, this obviously cannot be accomplished unless the operating system knows the identity (and perhaps the password) of the end user. As noted above however, most web-based file servers provide no built-in system for recognizing web users. While it may be possible to ask for a user ID and password each time a subset of CGI programs are executed, such a system would create far too much overhead since the number of programs requiring user ID or profile checking may be extremely high. Rather, what is preferred is a system that keeps track of who the user is each time a CGI program is executed and then acts accordingly.

Some HTTP servers are known to include processes for performing very limited forms of basic user authentication. These servers, however, require that the web user provide a password each time the client is directed to a new server. Given the number of servers that may be involved in a web based network, this presents serious limitations. Thus, a system is required that can provide user authentication over a complete web based network.

SUMMARY OF THE INVENTION

The present invention provides a system and method for identifying and responding to a user's authority level on a web based network. In a first aspect, the invention includes a network system having a web server, such as an HTTP server, at least one web client that includes a mechanism for submitting user information along with CGI execution requests to the web server, and at least one self authenticating CGI program that is initially executable under a default user mode or user ID. The CGI program includes a means for examining the user information, a means for determining the privilege level of the user, a means for causing the program to run in a non-default mode, a means for storing and returning the user information back to the web client, and a means for returning the CGI program back to a default user mode.

In a second aspect, the present invention provides a method of providing user authentication that includes the steps of providing a web server that initially extracts user information from the end user during a one time logon procedure. The web server then stores password information for the user in a security object on the web server and stores other user information in hidden variables and sends the user information back to the web client in an HTML form. All subsequent CGI execution requests from the web client include the following steps. First, the user information is returned back to the web server with the execution request in the HTML hidden variables. Next, execution of the CGI program is commenced under a default user mode or ID on the web server. The user information received with the execution request is then examined and the authority level of the user is determined. The authority level of the user may be determined by obtaining password information from the security object. Next, the CGI program makes the appropriate system calls to cause the CGI program to run under a non-default user mode or ID. The user information is then again stored in HTML hidden variables and returned to the web client along with the results of the CGI program execution. Finally, the CGI program makes the appropriate system calls to cause the CGI program to return to execution in its default user mode.

Additionally, it should be recognized that this invention contemplates a network system having many HTTP servers, each comprising a generic or common protocol for implementing the herein disclosed user authentication system and method.

Finally, while this disclosure focuses on an implementation using CGI programs, it should be recognized that the systems and methods described herein may include any program types that are initiated by a web server. Thus, any web server API (application program interface), such as Netscape's™ NSAPI, Microsoft's™ ISAPI, or Java's Servlet API, or any other type of web program interface type may be substituted for CGI as described herein.

It is therefore an advantage of the present invention to provide user authentication in a web based network environment.

It is therefore a further advantage of the present invention to use an HTML form to pass user information back and forth between the client and the server thereby eliminating the need to prompt for user information.

It is a further advantage of the present invention to provide a means by which CGI programs can change execution modes in an HTTP server environment based on a privileged level of an end user.

It is a further advantage of the present invention to provide a security object on a web server for temporarily storing password information for users logged on to the network.

DETAILED DESCRIPTION OF THE PREFERRED EMBODIMENT

Figure 1A:
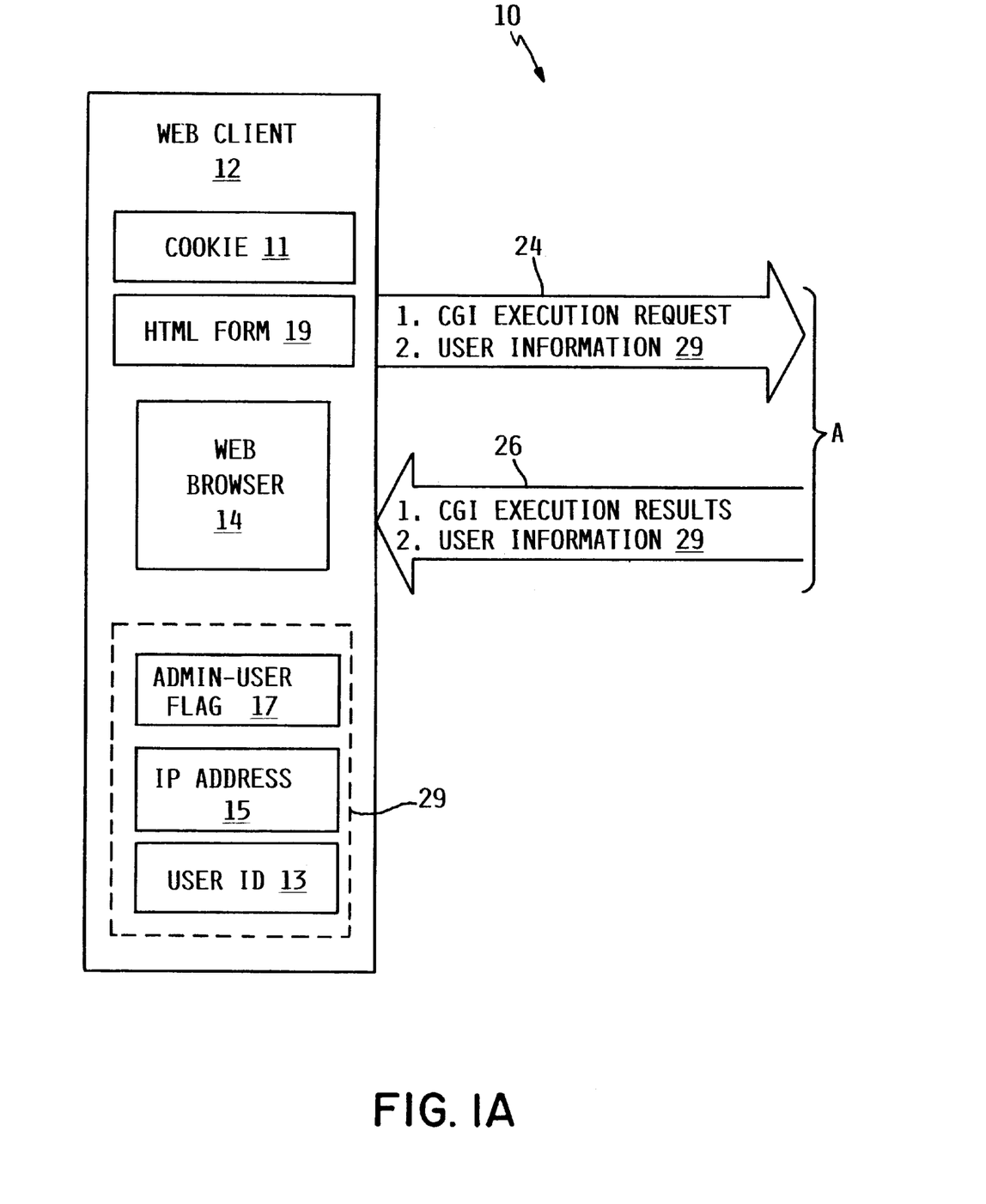
FIG. 1 depicts a block diagram of a web based client server network in accordance with a preferred embodiment of the present invention.
Figure 1B:
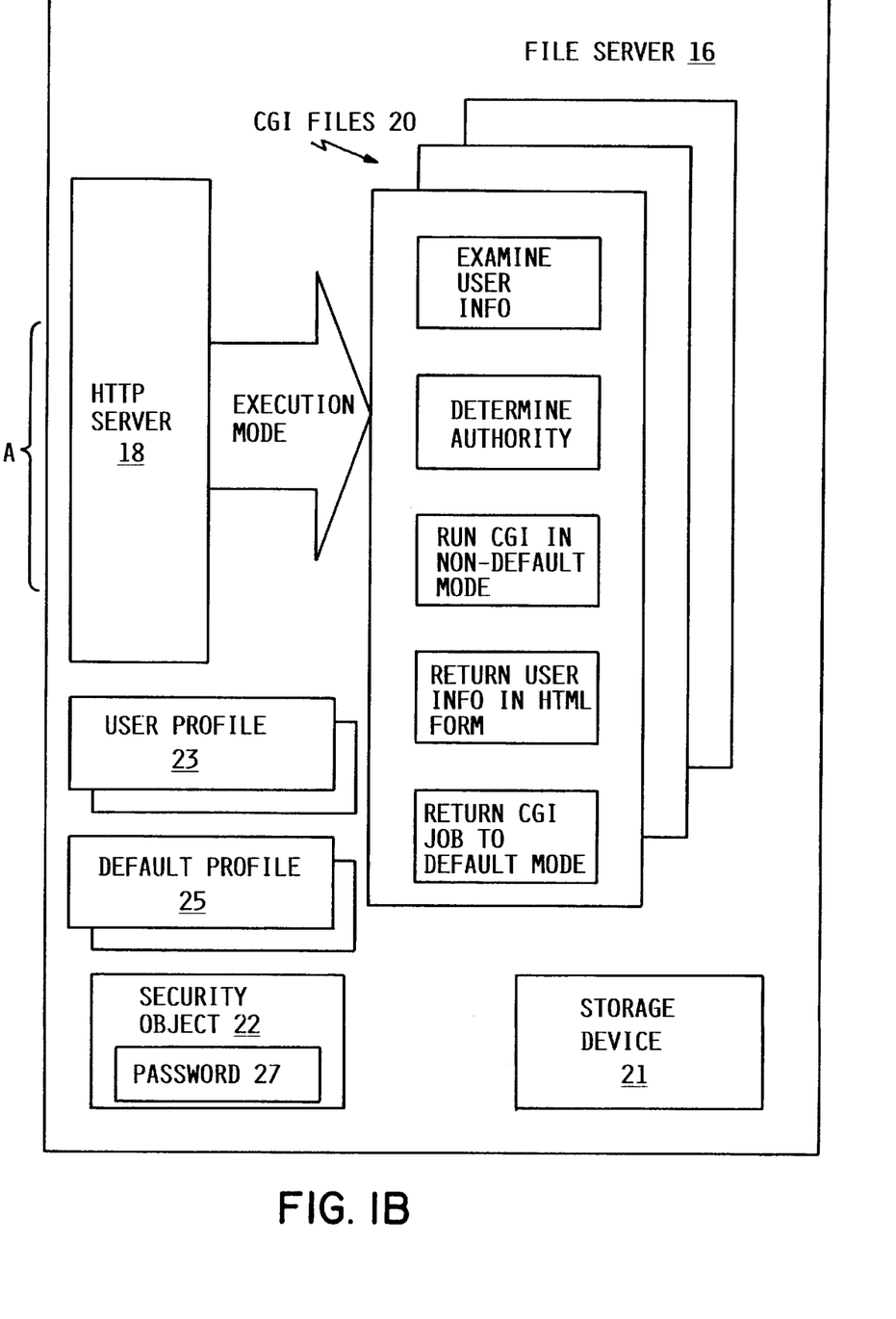

Referring now to the figures, FIG. 1 depicts a web based client server network 10. Included is a file server 16 that includes an HTTP server 18, a plurality of CGI programs 20, a security object 22, and a storage device 21. Also shown is a web client 12 running a web browser 14 that is in communication with file server 16. The communication link between web client 12 and file server 16 may be accomplished with any type of transmission link including ethernet, twisted pair, token ring, telephone wires, optical fibers, coaxial cable and/or a wireless transmission system.

The network system 10 operates as follows. When a web client 12 seeks to execute a CGI program on the file server 16, it submits a CGI execution request 24 to the HTTP server 18. Pursuant to this invention and along with the execution request 24, a set of user information 29 is also submitted that includes a user ID 13, an IP (Internet protocol) address 15 and an admin-user flag 17 (described below). It should be understood that additional user information, such as an encrypted password, part number, time and date information, etc., may also be included.

When the HTTP server receives the request, it launches the execution of a particular CGI program 20 under a default execution profile or mode 25. The CGI program 20, which then begins to run under the default mode, launches a series of novel procedure calls that perform user authentication. The procedures include a mechanism for examining the user information, a mechanism for determining the authority privilege level of the user, a mechanism for causing the CGI program to run under a non-default user profile 23, a mechanism for returning the user information back to the web client (typically with the results of the CGI execution), and a mechanism for returning the CGI job back to its default mode or profile 25. The code for running these jobs may be included in the CGI programs 20 themselves, or may be stored elsewhere within or near the file server 16.

Authentication and/or authorization is thus accomplished 1) by providing a transparent means by which user information can be continuously retrieved from and returned to the web browser 14 each time a CGI program is executed; and 2) by providing a means by which CGI programs can dynamically change their own execution profile within the server's operating system.

In this preferred embodiment, the user information 29 is transferred back and forth between the client 12 and server 16 using hidden codes or HTML hidden variables for each CGI execution. Below is an example of a piece of HTML code that utilizes hidden variables within an HTML form.

```
<FORM NAME="mainForm">
<INPUT TYPE="HIDDEN" NAME="NSM_TAG_
   PROD" VALUE="5733A07">
<INPUT TYPE="HIDDEN" NAME="NSM_TAG_
   NSMUSER" VALUE="DEVON">
<INPUT TYPE="HIDDEN" NAME="NSM_TAG_
   NSMIPADDR" VALUE="9.5.100.109">
<INPUT TYPE="HIDDEN" NAME="NSM_TAG_
   NSMTERM" VALUE="NO">
<INPUT TYPE="HIDDEN" NAME="NSM_TAG_
   NSMADMIN" VALUE="YES">
<INPUT TYPE="HIDDEN" NAME="NSM_TAG_
   KEY" VALUE="855223380_50">
<INPUT TYPE="HIDDEN" NAME="NSM_TAG_
   NLV" VALUE="MRI2924">
<INPUT TYPE="HIDDEN" NAME="NSM_TAG_
   SERVER" VALUE="<BASE HREF=http://9.5.151.42/
   QIBM/NetworkStation/MRI2924/>">
<INPUT TYPE="HIDDEN" NAME="NSM_TAG_
   JVM_INSTALL" VALUE="YES">
<INPUT TYPE="HIDDEN" NAME="NSM_TAG_
   NAV_INSTALL" VALUE="NO">
<INPUT TYPE="HIDDEN" NAME="NSM_TAG_
   NSB_INSTALL" VALUE="NO">
</FORM>
```

Hidden variables are a defined mechanism within the HTML language that may be included as part of a form 19 within an HTML document. Hidden variables within a form are variables that are transparent to the user under normal viewing conditions. Forms are used in web-based HTML applications as one method for transferring information back and forth between a client 12 and a server 16. (Thus, forms may be used to extract and return information from a user to a server, such as when a user is prompted for information, or they may be used to return information to a user, such as when an HTML documents is returned to the browser 14 by a CGI program.) In this case, hidden variables are used to send a user ID (stored in NSM_TAG_NSMUSER) "DEVON," an IP address (stored in NSM_TAG_NSMAPADDR) of 9.5.100.109, an admin-user value (stored in NSM_TAG_NSMADMIN) of "YES," and a plurality of additional information.

As noted above, user information 29 is uploaded to the server during each CGI execution request 24 and returned back to the client with the results of each CGI program 26. Thus, because the server receives and immediately returns the user information, there is generally no need to worry about long-term storage and management of user information 29 on the server. On the client side however, the web browser 14 may include a means for storing and managing the user information 29 until the next CGI request occurs by the browser 14.

It should be recognized that while this preferred embodiment handles the transportation of user information 29 with hidden HTML variables, any alternate means is likewise within the purview of this invention. For example, the transportation of user information could be accomplished with "Cookies" 11. Cookies are nuggets of data that are sent to the browser 14 from a web server 16. A cookie 11 can contain any type of data. Cookies 11 are then returned to the server 16 if the particular link (or URL) is in the Cookies' database.

While the preferred embodiment does not transfer an actual password back and forth between the client and server, this is recognized as a possible alternate embodiment for this invention and is described below. The preferred embodiment operates by first extracting a user password 27 and storing it in a security object 22. (Extraction is typically done during an initial logon procedure.) The password 27 can then be readily re-obtained later by the server 16 from the security object 22 based upon the user information 29. This implementation provides increased security since password information is never transmitted back to the browser 14.

As noted, an alternate embodiment would be to include an encrypted password in the user information 29 that can be passed from the client 12 to the server 16. This would eliminate the need for the security object 22 on the server 16 since each password would be delivered directly to the server 16 during each CGI execution request 24. While this system may be less secure, it would be less complicated to implement in a network that utilized a high number of servers (e.g., the world wide web).

The mechanism for determining the authority of the end user is thus accomplished by first using the user ID 13 to retrieve the user's password 27 from the security object 22. This retrieval process may be initiated by a system call from within the CGI program 20. With the password 27, the CGI program can cause the operating system to run the program under a non-default user profile 23. This allows the same CGI program to behave differently depending upon the end-user's authority, thereby providing system authorization. Unique to this embodiment is the inclusion of a mechanism or system call from within the CGI program 20 which causes the CGI program 20 to switch the mode or profile from a default profile 25 to a specific user profile 23.

The CGI programs 20 and security object 22 will typically be stored on or near the server in storage device 21. Storage device 21 may be any known device capable of storing computer readable information. Examples of storage devices include CD-ROM, magnetic diskettes, tapes, transmission mediums, etc.

This system and method is further enhanced by the passing back and forth of an admin-user flag 17 for determining which screens to provide to the end user. For example, if the user is a systems administrator, screens may be downloaded to the client workstation that provide menu options not available to other users. If the end user happens to be a systems administrator, relevant CGI programs 20 may then be executed under his or her specific non-default user profile 23 (thereby allowing for remote configuration etc.) Once the program functions were performed, the CGI job would then be returned to run under the default profile 25.

Figure 2A:
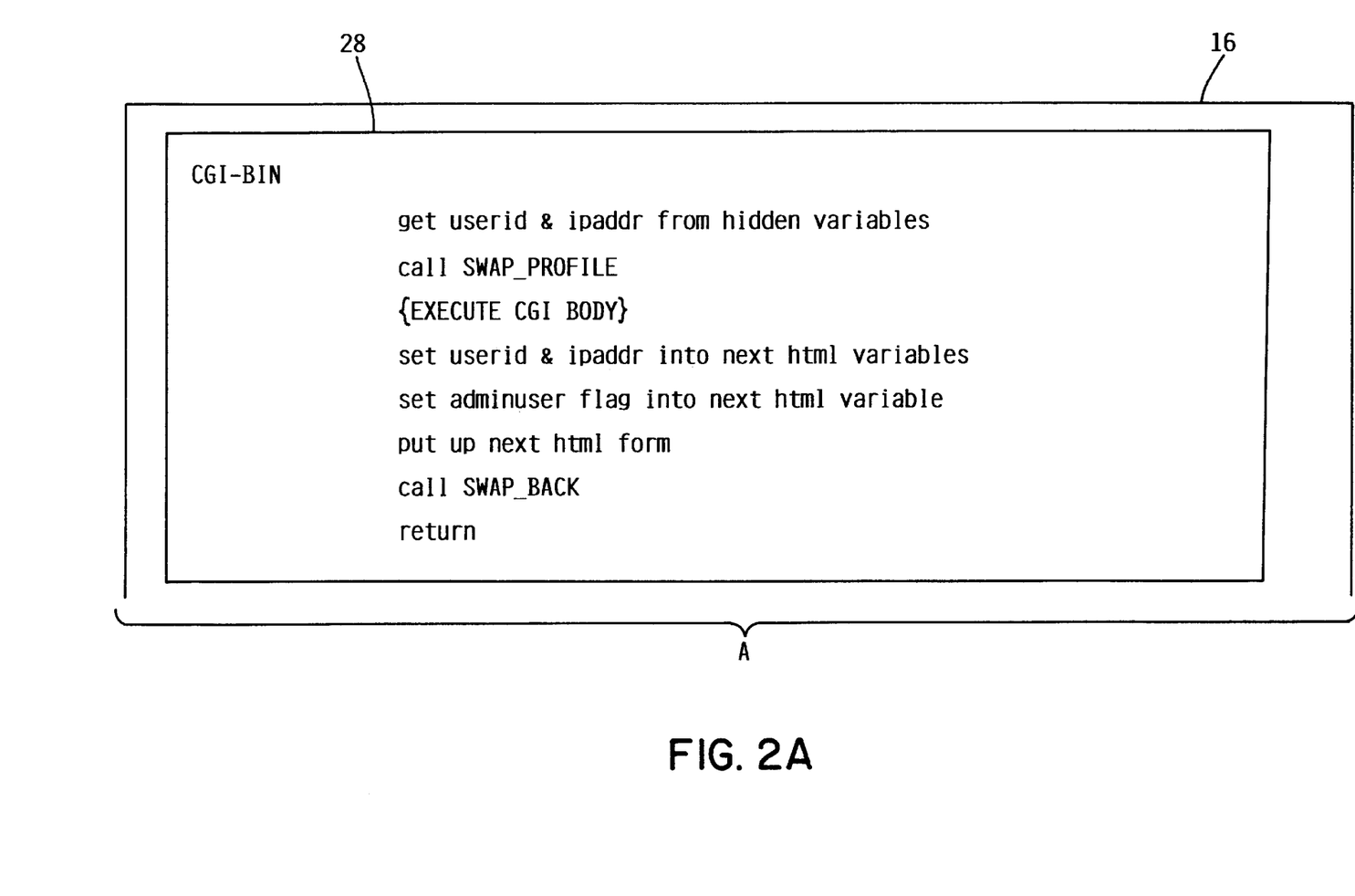
FIG. 2 depicts pseudo code from a CGI program and associated subroutines in accordance with a preferred embodiment of the present invention.
Figure 2B:
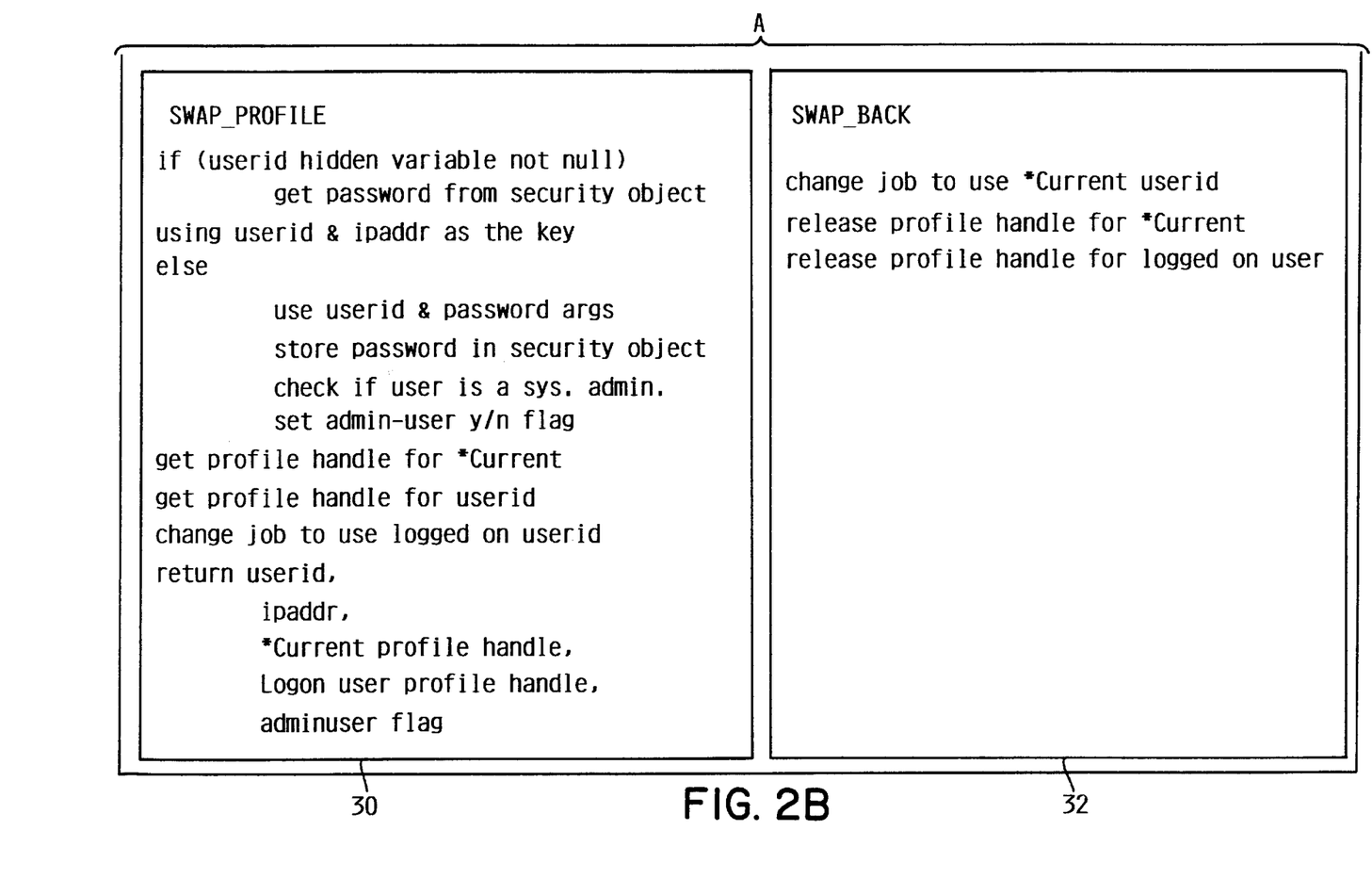

Referring now to FIG. 2, an example of a CGI program 28 (which may be an instance of the CGI programs 20 on file server 16 as shown in FIG. 1) is shown in pseudo code with associated procedures SWAP_PROFILE 30 and SWAP_BACK 32. Here it can be seen that each CGI program 28 first collects user information 29 that typically includes a user ID 13 and IP address 15 from the hidden variables in an HTML form 19. The program 28 then calls SWAP_PROFILE 30 which will retrieve the user's password 27 from the security object 22 and then cause the CGI program 28 to be executed under a non-default user profile 23. Once the body of the CGI program 28 is completed, the user ID and IP address are stored in the next HTML hidden variables along with an admin-user flag 17 in an HTML form, and returned back to the user with the results from the execution. Thus, a continuous means of passing user information back and forth between the client 12 and server 16 is provided. Finally, the sub-routine SWAP_BACK 32 is called which changes the job back to a default user mode 25. It should be recognized that these procedures can be readily generalized to be provide a generic user authentication for any file server system.

Figure 3:
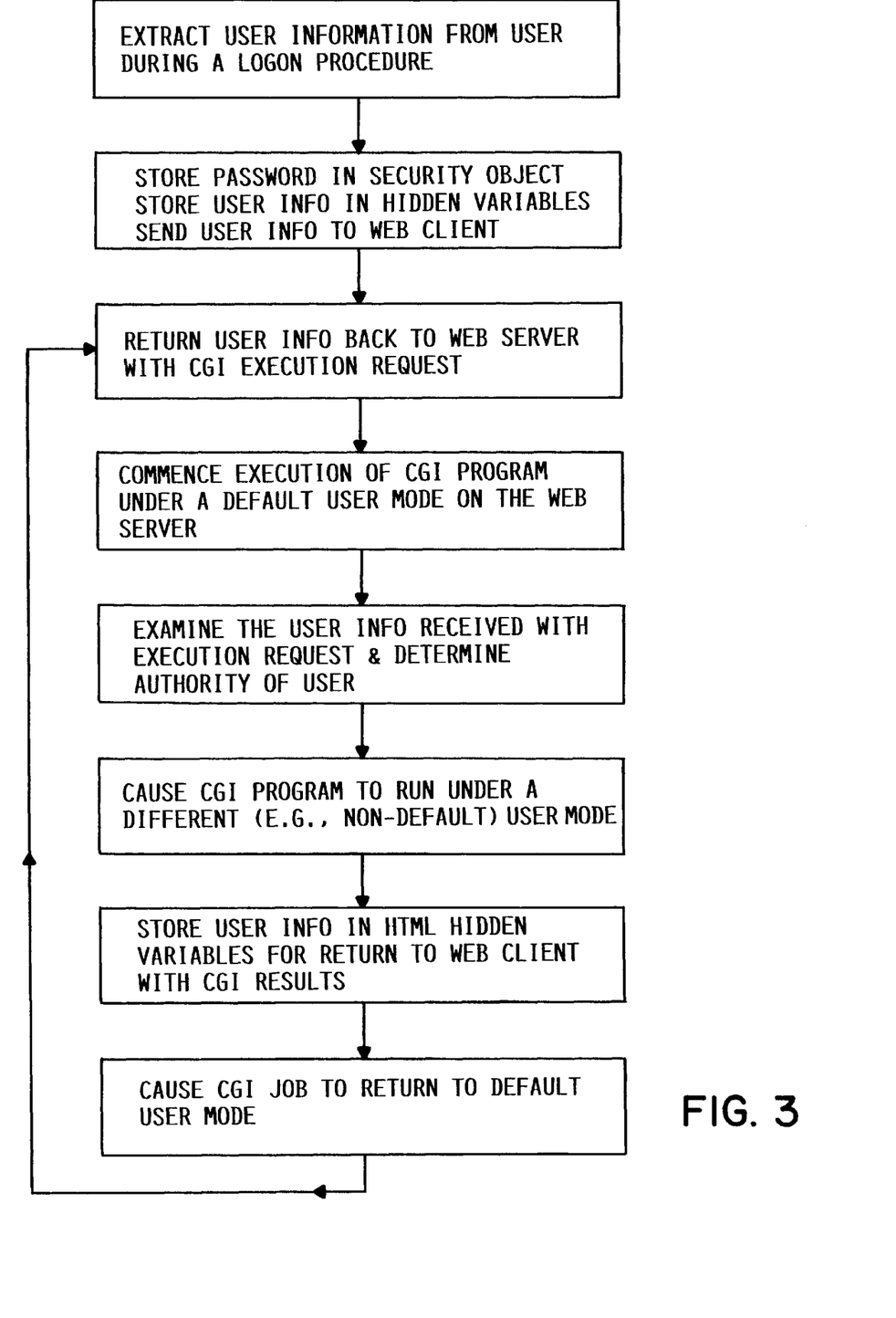
FIG. 3 depicts a flow diagram of a method of implementing user authentication in accordance with a preferred embodiment of the present invention.

Referring now to FIG. 3, a flow chart is shown depicting a typical method of implementation. First, user information 29 (e.g., user ID, password, IP address) is extracted from an end user during a logon procedure at a client site 12. This information 29 is then passed to the web server 16. It is important to note that this extraction is only required a single time. Next, the password 27 is stored in a security object 22 and the remaining user information is placed in hidden variables in a form and sent back to the web client 12 for future use. From this point on, any subsequent CGI execution requests by a web client 12 include the following steps. First, the web client 12 causes the user information 29 to be returned to the web server along with any CGI execution requests 24. Upon receiving an execution request, the HTTP server 18 causes the CGI program to be launched under a default user mode 25 on the web server 25. The CGI program 20 then makes the necessary system calls to examine the user information received with the execution request 24. From this information 29, the CGI program 20 determines the authority level of the user. The CGI program 20 then makes additional system calls to cause the HTTP server 18 to run the CGI program under a non-default user mode 23 if appropriate (i.e., it is run under a current user id or profile of the user). Next, the CGI program 20 causes user information 29 to be again stored in HTML hidden variables and returned to the web client with the results of the execution 26. Finally, the CGI program makes the appropriate system calls to cause the HTTP server to return the CGI program back to default mode 25. These sequence of steps are thereafter repeated as mentioned for each subsequent CGI execution request 24.

While the embodiments discussed above deal primarily with a traditional web-based network, it should be recognized that this invention has applications that are much more expansive. For example, this invention may cover a home security system wherein each client (e.g., a house alarm) may be networked to a server (e.g., a security company). It may cover web-tv applications, consumer electronics, and automotive systems. For example electronic devices may be configured to automatically browse web pages for warranty information. Automobiles may dial up a network to receive navigation information. Thus, any client-server environment that requires authorization may fall within the purview of this invention.

Additionally, it should be recognized that while HTML is the industry standard scripting language for web systems, any known or future scripting languages may be utilized herein. Finally, the embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. A network having a user authentication system, said network system comprising:
    a web server having an operating system that executes programs under a plurality of user modes;
    a web client having a mechanism that submits user information along with program execution requests to said web server; and
    a program being initially executable under a default user mode, said program having a first mechanism that examines said user information and a second mechanism that dynamically causes said operating system on said web server to run said program under a non-default user mode.

2. The network of claim 1 wherein said user information includes a user ID.

3. The network of claim 1 wherein said user information includes an IP address.

4. The network of claim 1 wherein said program comprises a common gateway interface.

5. The network of claim 1 wherein said program further includes a system that uses said user information to determine a privilege level of the user logged onto said web client.

6. The network of claim 1 wherein said program further includes a third mechanism that dynamically causes said operating system on said web server to switch said program to run back under said default user mode.

7. The network of claim 1 further comprising a system that extracts said user information from a user during a logon procedure.

8. The network of claim 1 wherein said program further includes a system that returns a new set of user information to said web client.

9. The network of claim 1 wherein said program includes a web server application program interface.

10. The network of claim 1 wherein said user information is stored in html hidden variables.

11. The network of claim 1 wherein said user information is stored in a cookie.

12. The network of claim 1 wherein said user information is transparent to the user.

13. A program product comprising:
    a recordable media; and
    a program recorded on said recordable media and being initially executable under a default user mode on an operating system running on a web based server, said program comprising a first mechanism that extracts user information from a plurality of hidden variables in a first html form submitted by a web client and a second mechanism that causes said operating system to run said program a non-default user mode.

14. The program product of claim 13 further comprising a mechanism that stores user information in hidden variables in a second html form and that returns said user information to said web client.

15. The program product of claim 13 further comprising a mechanism that retrieves a user password from said server based upon said user information.

16. The program product of claim 13 wherein said user information includes a user ID and an IP address.

17. A system for identifying and responding to a user's authority level on a web-based network, said system comprising:
    a mechanism that sends and receives user information back and forth between a web client and a web server;
    a plurality of programs, said programs being stored on said web server and being initially executable under a default user mode;
    a first subroutine callable from each of said programs, said first subroutine examines said user information sent from said web client;
    a second subroutine callable from each of said programs, said second subroutine uses said user information to determine the authority level of the user on said web client; and
    a third subroutine callable from each of said programs, said third subroutine uses said authority level of the user to cause each of said programs to run under a non-default user mode on said web server.

18. The system of claim 17 further comprising a fourth subroutine callable from each of said programs, said fourth subroutine causes said programs to return to run under a default user mode on said web server.

19. The system of claim 17 wherein said second routine includes a mechanism that retrieves a password for the user from said web server in order to determine the authority level of the user.

20. The system of claim 17 wherein said password is stored in a security object on said web server during a logon procedure.

21. The system of claim 17 wherein said user information is stored in html hidden variables.

22. The system of claim 17 wherein said user information is stored in a cookie.

23. A method of automatically authenticating a user on a web based network during the execution of programs on a web server when submitted from a web client comprising the steps of:
    sending user information to the web client each time a program finishes executing on said web server;
    returning said user information from the web client to the web server during a new execution request by said web client;
    launching a new program from said web server under a default user mode;
    examining said user information received with said execution request;
    determining an authority level of the user based upon said user information; and
    causing the new program to be run under a non-default user mode.

24. The method of claim 23 further comprising the initial one-time step of collecting user information during a logon procedure.

25. The method of claim 23 further comprising the step of storing a user password in a security object on said web server during said logon procedure.

26. The method of claim 25 wherein said step of determining the authority level of the user based upon said user information includes the step of using said user information to retrieve said password stored in said security object.

27. The method of claim 25 wherein said user information is stored in html hidden variables.

28. The method of claim 25 wherein said user information is stored in a cookie.

29. The method of claim 23 further comprising the steps of returning a new set of user information to said web client.

30. The method of claim 23 further comprising the step of causing the new program to run back under said default user mode.

31. A method of setting the appropriate level of authority during the execution of programs initiated by a web server when requested by a web client having a user logged thereon, wherein said user has a predetermined user privilege level, said method comprising the steps of:

extracting user information for said user during a logon procedure;

storing said user information as html hidden variables in an html form and returning said html hidden variables to said web client;

for each subsequent request by said web client to execute one of said programs, performing the steps of:

sending said html hidden variables back to said web server along with said execution request;

commencing execution of said program under a default mode;

examining said user information in said html hidden variables;

using said user information to determine the level of authority of the user;

dynamically causing the program to be executed under the appropriate level of user authority;

storing said user information as html hidden variables in a new html form and returning said html hidden variables to said web client; and         returning said program to its default mode.

32. The method of claim 31 wherein said user information includes an IP address.

33. The method of claim 31 wherein said user information includes a user ID.

34. The method of claim 31 wherein said user information includes an admin-user flag.

35. A method of automatically authenticating a user on a web based network during the execution of programs on any one of a plurality of web servers when submitted from a web client, comprising the steps of:

returning user information back to the web client from one of said web servers each time a program finishes executing a job for said web client, wherein said user information is stored in html hidden variables;

sending said user information from the web client to the next web server responsible for implementing the next program execution request by said web client;

initiating execution of said next program from said web server under a default user mode;

examining said user information received with said program execution request;

determining an authority level of the user based upon said user information; and     causing the new program to be run under a non-default user mode.

36. The method of claim 35 wherein said programs include a common gateway interface.

37. The method of claim 35 wherein said programs include an application program interface.

38. A program product, comprising:

a first plurality of hidden codes that store user information created by a browser, said first plurality of hidden codes being transmittable to a web server;

a second plurality of hidden codes that store user information created by a job running on said web server, said second set of hidden codes being transmittable to said browser; and     signal-bearing media bearing the first and second plurality of hidden codes.

39. The program product of claim 38 wherein said first and second plurality of hidden codes reside in an html form.

40. The program product of claim 38 wherein said first and second plurality of hidden codes are identical.

41. The program product of claim 38 wherein said first and second plurality of hidden codes include a user ID.

42. The program product of claim 38 wherein said first and second plurality of hidden codes include an IP address.

43. The program product of claim 38 wherein said first and second plurality of hidden codes include an admin-user address.

* * * * *